United States Patent [19]

Freeman et al.

[11] 4,031,363

[45] June 21, 1977

[54] DISPLAY APPARATUS FOR AUTOMOTIVE VEHICLES

[75] Inventors: John D. Freeman, Westport, Conn.; Ralph C. Robinson; Kenneth D. Swonger, both of Charlotte, N.C.

[73] Assignee: General Time Corporation, Thomaston, Conn.

[22] Filed: May 17, 1976

[21] Appl. No.: 686,826

[52] U.S. Cl. .......................... 235/150.2; 340/52 F; 73/114; 235/92 FQ
[51] Int. Cl.² ........................................ G06F 15/20
[58] Field of Search ....... 235/151.3, 151.32, 150.2, 235/61 J, 150.21, 92 T, 92 TF, 92 FQ; 73/112–114; 340/52 F, 52 R, 27 R

[56] References Cited

UNITED STATES PATENTS

| | | | |
|---|---|---|---|
| 3,797,010 | 3/1974 | Adler et al. | 324/161 X |
| 3,899,770 | 8/1975 | Slotkowski | 340/52 F |
| 3,944,969 | 3/1976 | Arai et al. | 340/52 F |
| 3,950,700 | 4/1976 | Weisbart | 324/161 |

Primary Examiner—Edward J. Wise
Attorney, Agent, or Firm—Pennie & Edmonds

[57] ABSTRACT

Apparatus capable normally of presentation of time in hours and minutes and upon command of other functions, such as miles before service is required and days before service is required. The apparatus includes at least one logic integrated circuit for providing required frequency division of various inputs, a storage for accumulating information received from the integrated circuit and for retaining the information over a period of time even though power to the circuit is interrupted, a power supply and a display for displaying information on demand.

23 Claims, 8 Drawing Figures

DISPLAY APPARATUS FOR AUTOMOTIVE VEHICLES

BACKGROUND OF THE INVENTION

The present invention is directed to an apparatus for display of information in addition to a display of time in hours and minutes which normally is of interest to the operator of a vehicle, such as an automobile.

Present day vehicles of the stock variety have capability of the presentation of certain forms of information which are visually interpreted by the driver as well as forms of information relating to the sounding of devices which are audibly interpreted. In this manner the vehicle operator may be provided with an indication of a low oil pressure condition, a fuel low condition, vehicle speed in excess of a proper level, excessive engine-coolant temperature, the failure to secure seat belts and the like.

In recent years there has been an increase in the type as well as the number of systems capable of providing warning of either a malfunction, an improper use, or the existence of what is then or which may become a hazardous condition. Thus it is becoming common in the prior art to provide the vehicle operator with an indication of a failure in an exhaust emission control system, a failure in a vehicle brake system, a failure to remove the key from the ignition switch while about to leave the vehicle and many more as are becoming well known. With respect to some or all of these operator warnings, it is desirable to provide not only an indicating lamp or gauge display of a vehicle condition or malfunction, but also a more obtrusive warning, such as may be produced by an audible warning device such as a buzzer or tone generator.

BRIEF SUMMARY OF THE INVENTION

The present invention has as an object to expand on apparatus of the prior art thereby to provide at a single display and on demand information which is not now available according to the present state of the art. The display may include a plurality of display zones one of which is illuminated by action of an array of light emitting diodes, while others of the display zones are formed by panels containing fixed indicia and illuminated by other forms of radiation. Normally, information of time in hours and minutes comprises the presentation at the display. On demand and upon action initiated by the operator of the vehicle, other presentations may be provided at the display to advise the operator of the vehicle of the last service period and when, in miles or days, service is again to be performed, the miles of a trip, the average miles travelled per gallon of gasoline, the volume of gasoline then in the fuel tank, the miles remaining until the destination is reached, and others of similar nature. By action of the system, when any information is desired the information of time although continually updated is isolated from the display and only the demanded information is capable of appearing. Likewise, during the display of time, all forms of information capable of being displayed are isolated from the display. The apparatus includes logic integrated circuitry for development of the input information to the display and a storage for the accumulation of the input information thereby at any time the displayed information will be indicative of the condition at the time of display. The storage has capability of the retention of information over an extended time interval even under the condition that power is removed from the system.

The apparatus, also, has capability of the automatic display of information indicating the requirement of the performance of service on the vehicle and the periodic display of this information until service is performed and the apparatus is reset.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE PREFERRED EMBODIMENT

Figure 1:
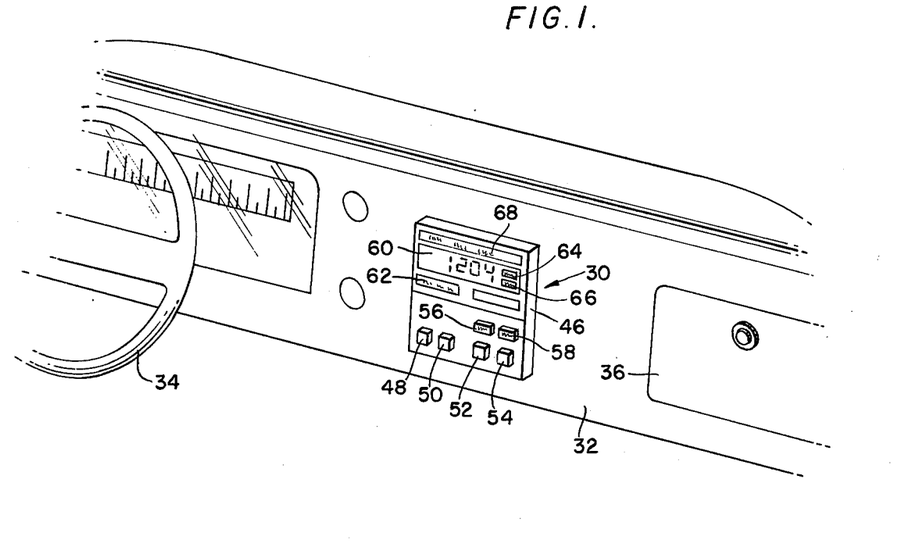
FIG. 1 is a perspective view of a dashboard of an automotive vehicle having the service reminder of the present invention mounted therein.

The service reminder 30 (herein referred to as "SR system") is illustrated as being mounted in a dashboard 32 of an automotive vehicle, generally in the region between the steering wheel 34 and glove compartment 36. This orientation of the SR system is merely illustrative of many orientations which may be possible thereby to maintain the display and manipulative components within both the view and easy reach of the operator of the vehicle thereby to allow the operator to accomplish the various functions of which the SR system is capable and provide the operator with information, as will be described.

Figure 2:
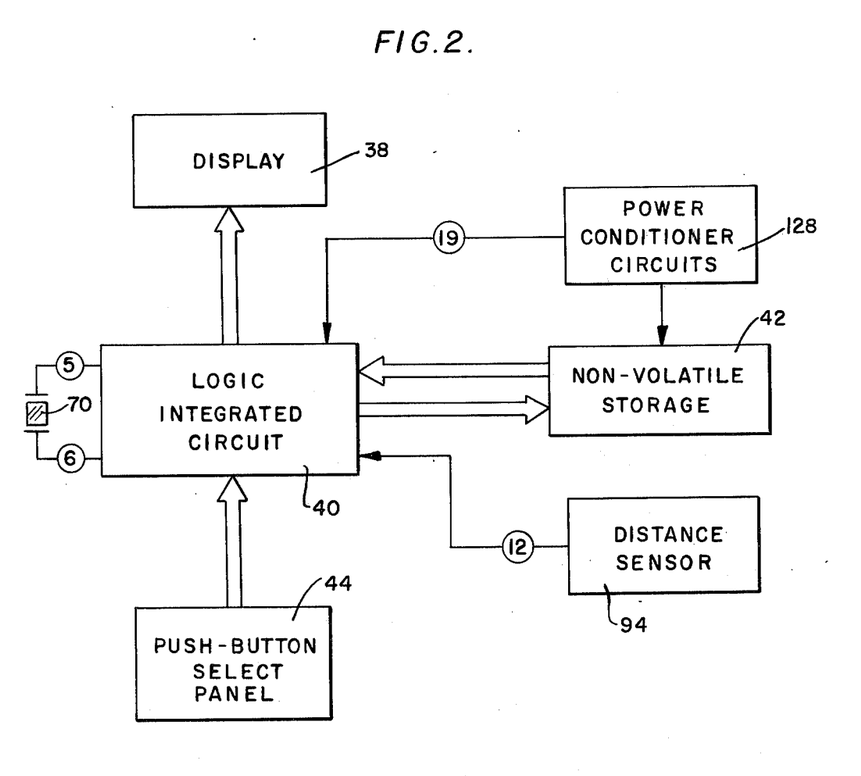
FIG. 2 is a simplified block diagram of the electrical components which comprise the service reminder.
Figure 6:
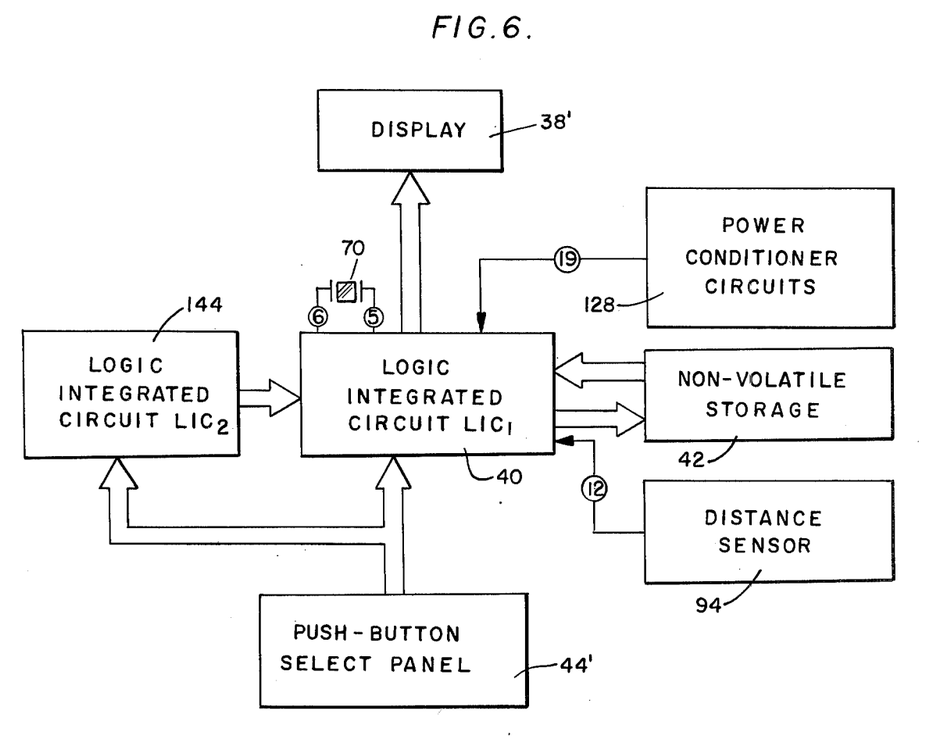
FIG. 6 is a simplified block diagram of an expanded system of the service reminder; and, FIG. 7 is a functional block diagram of the expanded system of the service reminder.
Figure 7:
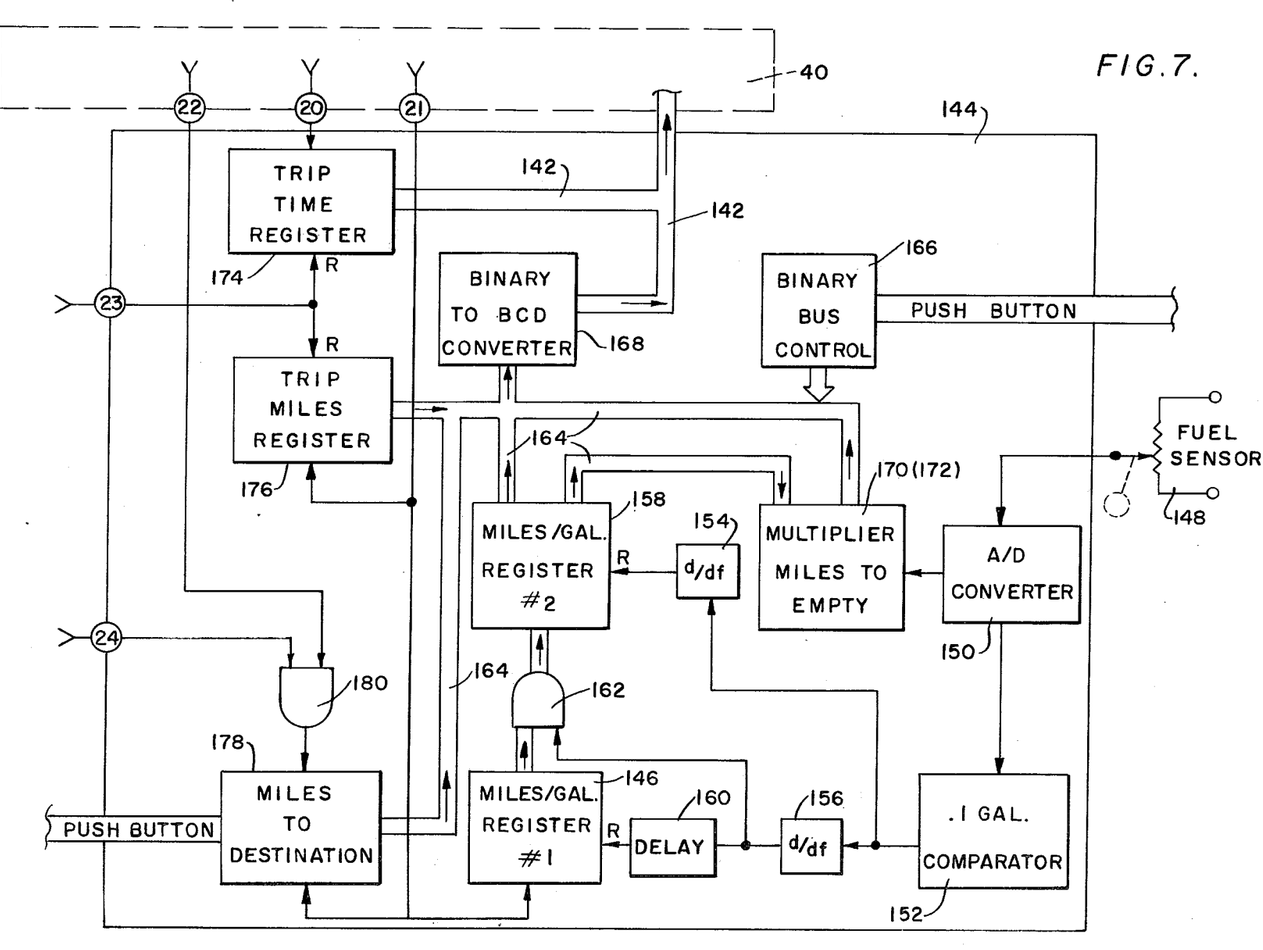

The SR system, referring to the system of FIG. 2, includes four major components among which are the display 38, the logic integrated circuit 40 (herein referred to as "IC-1") the non-voltatile storage 42 (herein referred to as "storage") and the push-button select panel 44. These components may be supported by and housed within a housing (not shown) which is closed by a front panel 46. The front panel supports a plurality of push buttons 48, 50 . . . and 58 of the type which are biased outwardly and actuated inwardly. The push buttons are disposed to the bottom of the panel which also carries a plurality of display zones 60, 62 . . . and 68 for displaying information as to the various functions, namely the condition of the function at that time. In this connection the display zone 60 may include four display areas for the display of numeric indicia indicative of the time of day, the miles travelled during a trip, the miles remaining before the vehicle is to be serviced, among other functions, as will be described. The display areas of display zone 60 preferably are illuminated by an array of light emitting diodes (herein referred to as "LED") formed conventionally by a seven segment assembly. FIG. 1 illustrates a four digit display of the time of day in hours and minutes, such as the display "12:04." The display will be in readily visible color and may be either in a 12 hour or 24 hour format. The remaining displays within the display zones 62, 64 and so forth comprise fixed lettering on a surface which is illuminated by other sources of radiation, such as an electric lamp. In operation, some display zones will be illuminated concurrently with a display within display zones 60. Thus, if the operator should desire information as to the number of miles of travel before service, the push button 58 will be depressed thereby to present a reading of mileage within the display zone 60 and to illuminate both the display zones 62 and 66. Similarly, if the operator should desire to know the number of days remaining until service is to be performed push button 56 is depressed. In this manner, the number of days will be presented within the display zone 60 and both the display zones 62 and 64 are illuminated. In the latter, push button 56 activates the SR system such that at the display 38 the operator will visually read "585 MILES TO SERVICE." The numerals will appear within the ones, tens and hundreds area of display zone 60 by operation of the LED devices, while the appropriate electric lamps will illuminate the fixed lettering at display zones 62 and 66. The fixed lettering at display zone 68 is illuminated when it is desired by the operator to know which time for service period is approaching and automatically by the SR system when service is required because of a count-down either of miles travelled or the passage of days from the last service. The push buttons 48, 50, 52 and 54 are for purposes of setting the time display within the display zone 60. These operations as well as other operations of the SR system will become apparent as the description continues in connection with the discussions of each of FIGS. 3A and 3B as well as the discussion in connection with the expanded form of the SR system as illustrated in FIGS. 6 and 7. In the expanded form of the SR system additional push buttons (not shown) will be provided in order to activate further system functions.

CLOCK FUNCTION

The normal display of display 38 within the display zone 60 is that of time in hours and minutes. The display, while normally presented, is deenergized for purposes of conversation of energy when the ignition switch is in the "off" condition. In this connection, the LED devices require power in excess of the requirements of the remainder of the SR system which continues to be energized irrespective of whether the ignition switch is "on"or "off."

Figure 3A:
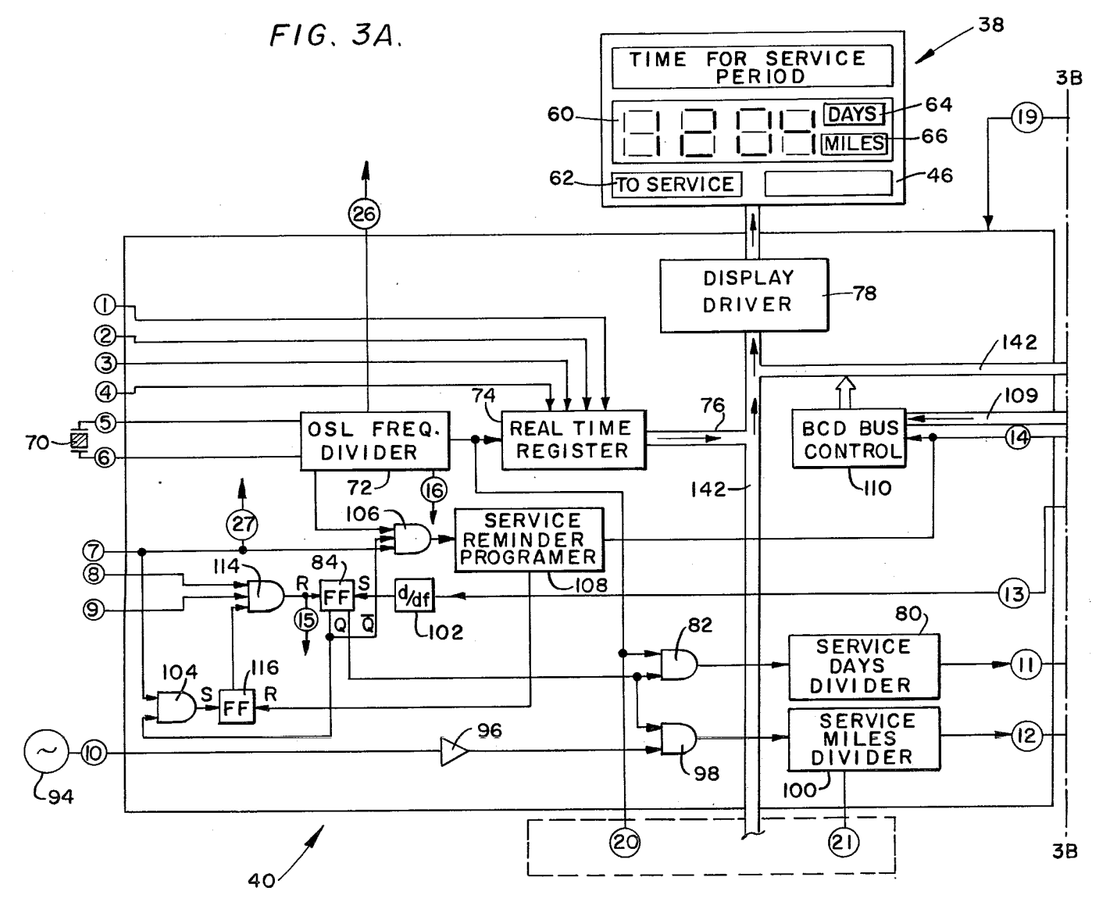
FIGS. 3A and 3B comprise a functional block diagram of the service reminder.
Figure 3B:
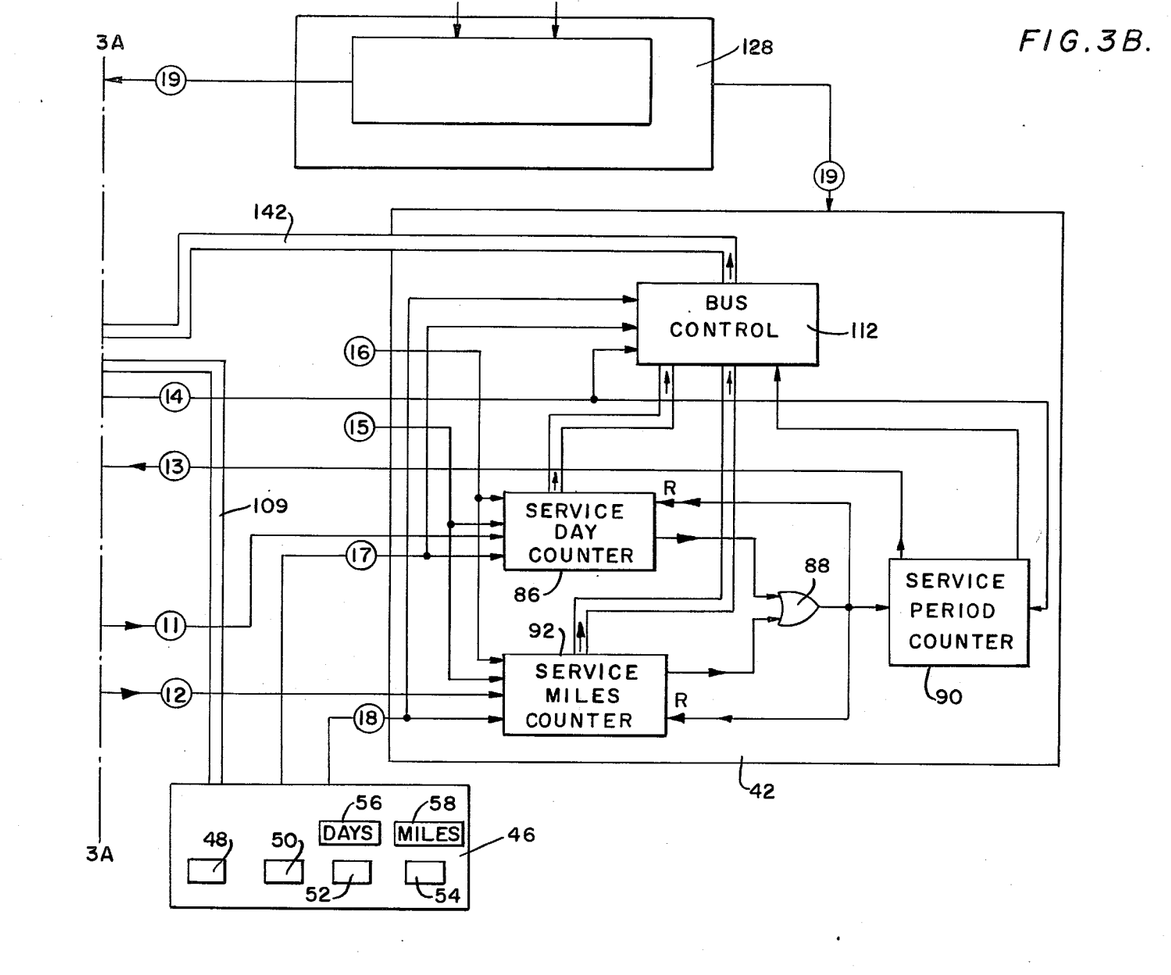

The operation of the clock may be appreciated from FIGS. 3A and 3B of the drawing. The SR system includes a quartz crystal 70 connected across the terminals 5–6 of IC-1 40. The crystal is an AT cut and oscillates at a frequency of 3.145728 MHz. The oscillator is connected to an oscillator frequency divider 72 (herein referred to as "OFD") including a plurality of inverter components (not shown) so that with count down in successive binary steps the input frequency may be divided to provide a plurality of outputs. These outputs include an output of 64 Hz, 1 Hz and of 1 pulse per minute (ppm). The 1ppm output from OFD 72 is connected to a real time register 74 (herein referred to as "RTR") including binary counting stages thereby to provide 3-state minute and hour outputs in binary coded decimal (BCD) form to the BCD bus 76. In normal operation, i.e., when the vehicle ignition switch is on the 3-state outputs are enabled and applied to the display driver 78 (herein referred to as "DD") and then to the array of LED devices which indicate time in hours and minutes within the display zone 60.

The external circuit components, in addition to oscillator 70, include both fixed and variable capacitors to provide frequency adjustment.

RTR 74 may be set by the application of pulses at a repetition rate of 1 pulse per second (pps) at the terminals 1, 2, 3 and 4 of IC-1 40. These inputs are applied to the appropriate divider stages in RTR 74 to update the time display by the appropriate actuation either of push button 48, 50, 52 and 54 or combinations thereof supported by the front panel 46. To this end, the push buttons 48 and 50 control the hours indication, while the push button 54 controls the tens-of-minutes and push button 52 controls the hundredths-of-minutes. The panel 46 is also connected to a numerical update bus 109 whereby information in BCD form as determined by actuation of one or more buttons 48, etc. is connected to BCD bus control 110 (herein referred to as "BCC").

SERVICE CALCULATOR FUNCTION

1. Days Remaining to Service

The 1ppm output from OFD 72 is gated to the service day divider 80 (herein referred to as "SDD") by AND gate 82 which is enabled by the complimentary ($\bar{Q}$) output of set reset flip flop 84 (herein, as other like devices, referred to as "FF"). SDD functions to divide further the output of OFD 72 thereby to provide as an input to a count down divider 86 (herein referred to as "NVD") pulses at the rate of 1 pulse per day (ppd). NVD 86 is a day count down divider and functions with each input pulse to count down from an initial setting of 304 days to 0 days at which time it provides an output to OR gate 88.

When the SR system is initially enabled by the dealer or when it is subsequently enabled following completion of service, NVD 86 is initialized to a 304 count condition. This count or any count as reduced by a number of input pulses received by NVD 86 may, on demand, be read out of its BCD down-counter (see FIG. 4) as a visual readout on the display zone 60. When it is desired to know the count, as will be more particularly set out, a bus control which normally isolates the count from the display 38 by a high impedance lowers the impedance at the output and passes the count to the display. The output of RTR 74 during this time will be isolated from the display.

As each pulse is received and stored by NVD 86 the number decreases such that the count which is displayed always represents the number of days remaining to the next service period. As indicated, when the counter has received 304 pulses it provides an output to OR gate 88, which output is gated to the service period counter 90 (herein referred to as "SPC"). SPC 90 is a binary single decade up-counter whose output always indicates the number of service periods that have been completed. Thus, at the end of the first service period of the vehicle, i.e., after passage of 304 days or, as will be described, after a distance of 10,000 miles has been travelled SPC 90 will have received and will have stored a single pulse.

The output of OR gate 88 is also gated to the reset terminal of NVD 86 to set the counter to a zero count condition. The output of OR gate 88 is additionally gated to the reset terminal of a count down divider 92 (herein referred to as "NVM") which is a miles count down divider to reset the counter to the zero condition, also. As will be set out, SPC 90 will receive and store a count of 1 upon an output either from NVD 86 or NVM 92 and both of these circuits will be reset to the zero condition concurrently irrespective of the fact that only one of the counters will have counted down completely from the initial setting.

2. Miles Remaining to Service

The miles to service calculation requires a mileage sensor 94 whose output is in the form of pulses at a rate of 8000 pulses per mile (p/mile). The mileage sensor may include a generator for generating a sinusoidal frequency proportional to miles per hour, an amplifier and a wave squarer such as a Schmidt trigger. The pulses are connected to one input terminal of AND gate 98 by an operational amplifier 96. AND gate 98 also is enabled by the complimentary output of FF 84 such that the pulsed output of the mileage sensor 96 at terminal 10 of IC-1 40 is passed to the service miles divider 100 (herein referred to as "SMD"). SMD 100 functions to divide the frequency of the input thereby to provide as an input to NVM 92 pulses at a rate of 1 p/mile. SMD 100 is an 8000:1 divider and conditions the output thereby to provide a count down from 10,000 in NVM 92. In a manner similar to the operation of NVD 86, NVM 92 functions when it shall have received 10,000 pulses to provide an output to OR gate 88 and thence to SPC 90 which shall store a pulse indicative of the service period which then is due.

The SR system as is illustrated in FIGS. 3A and 3B utilizes SDD 80 as a divider in view of the fact that if RTR 74 were used for these frequency divisions service time would be lost during the setting of the clock display.

When SPC 90 is updated by a count of one upon an output from OR gate 88, SPC 90 functions to provide an output to differentiator 102 at terminal 13 connecting IC-1 40 and storage 42. The output of differentiator 102 in the form of pulse representing the rise time of the output of SPC 90 is connected to the set terminal of FF 84. FF 84 functions to disable both AND gates 82 and 98 until FF 84 shall be reset at the completion of service. Until FF 84 is reset, the 1ppm pulses from OFD 72 that normally are applied to SDD 80 and SMD 100 cannot be received and NVD 86 and NVM 92 neither receive pulses nor provide any count down.

The input at the set terminal of FF 84 causes the complimentary output, the enabling input of AND gates 82 and 98, to go low while the other output goes high. This latter output is connected to one input terminal of each of AND gates 104 and 106 for purposes to be explained.

3. Service Reminder Function

The second and third input terminals of AND gate 106 are connected to and derive their input from the input at terminal 7 of IC-1 40 and an output from OFD 72. The input at terminal 7 is high when the ignition circuit is energized and the output of OFD 72 comprises the 1 Hz clock pulses. Thus, when the ignition is on and FF 84 is set, AND gate 106 gates the 1 Hz clock pulses to service reminder programmer 108 (herein referred to as "SRP") which functions in a manner to provide a periodic display at display 38 thereby to advise the operator that service is required. An output of SRP 108 is connected to BCC 110. This output is a programmed output which simultaneously is connected to one input terminal of bus control 112 and an input terminal of SPC 90. The operation of the bus control 112 will be fully discussed below but for the sake of the present discussion the output of SRP 108 causes a display of the service reminder message within the display zone 68 and the number stored in SRP 90 within at least one area of display zone 60 for a period of time commencing when the ignition is turned on and periodically thereafter for a short period of time until service has been completed and the service calculators are reset. For example, the service reminder message and the stored number which interrupt the display of the clock function may be displayed for a period of about 30 seconds following the turning on of the ignition and for a period of about 15 seconds during consecutive 5 minute periods thereafter. Simultaneously, with the display of the stored number within, for example, the area used to display tens-of-minutes the programmed output of SRP 108 controls the switching of lamps within the display zone 68 to illuminate within one or two panels the message "TIME FOR SERVICE PERIOD." The stored number will inform the operator that the vehicle has reached its 1st, 2nd, 3rd, . . . 10th service period.

The service calculators may be reset by depressing simultaneously the days and miles push buttons 56 and 58 within a short period of time after turning the ignition on. Depression of push buttons 56 and 58, an action which in all likelihood would not be inadvertent, serves to provide an input at terminals 8 and 9 of IC-1 40 which are are connected to two of the three input terminals of AND gate 114. For example, the depression simultaneously of the push buttons may be required in the first 5 seconds after the ignition is turned on or else the action will have no effect. Thus, as previously stated, when a service period has been completed FF 84 is set and a high output is applied to AND gate 104. The AND gate 104 is enabled when the ignition is turned on thereby to set FF 116. The output of FF 116 is connected to the remaining input terminal of AND gate 114. Thus, if the push buttons are depressed simultaneously FF 84 will be reset. If, however, this operation is not accomplished within the first 5 seconds FF 84 will not be reset. To this end, after a delay of 5 seconds following the ignition being turned on, SRP 108 provides an output to the reset terminal of FF 116 which disables ANd gate 114.

When the resetting operation is successfully carried out the service calculators NVD 86 and NVM 92 will be initialized to counts of 304 and 10,000, respectively, by the reset pulse comprising the output of AND gate 114 to terminal 15 of storage 42. Receipt of pulses from SDD 80 and SMD 100 and a count down by both NVD 86 and NVM 92 now may commence, once again.

THE DISPLAY

Various data may be displayed in digital as well as lettered form in one or a combination of the display zones 60, etc. In addition the display of time in hours and minutes, there may be, as briefly discussed, a display of days to service, miles to service and a display of service reminder information. In addition, the SR system may be expanded as will be discussed in connection with FIGS. 6 and 7 to obtain information relating to miles per gallon, miles driven, etc., which information also is displayed within one or a combination of display zones.

A discussion directed to the functions of days to service, miles to service and their display now will be set out. For aid in an understanding of the same reference may be had to FIGS. 3A, 3B and 4.

Days to service information may be obtained by depressing the push button 56 supported by the front panel 46. When the push button is depressed an input is provided at terminal 17 of storage 42. This input is connected to one input terminal 17 of AND gate 118 and to the BCD bus control 112. This input enables the AND gate whose other input terminal is connected to the 64 Hz clock pulses from OFD 72. The clock input is at terminal 16 of the storage 42.

Figure 4:
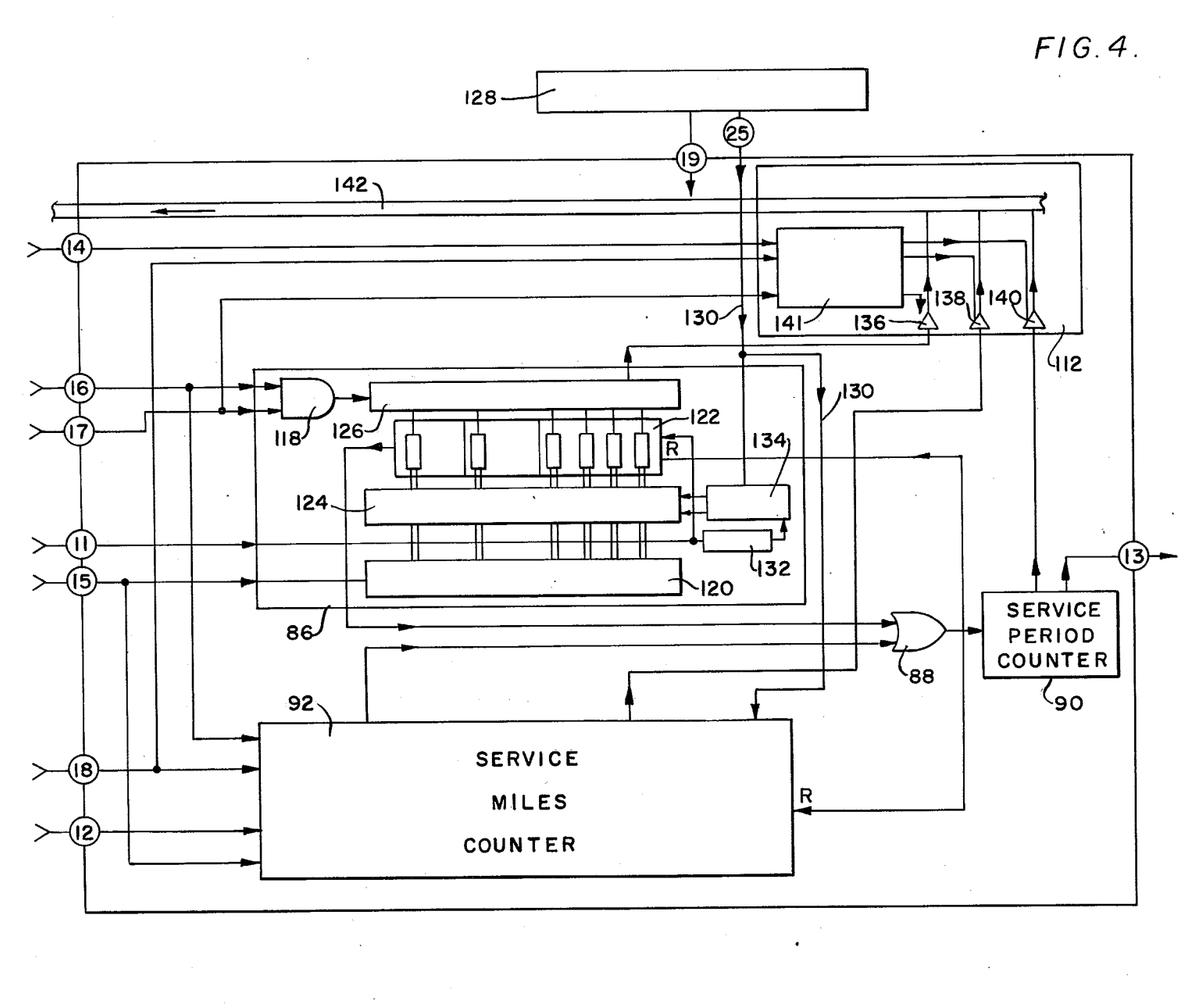
FIG. 4 is a functional block diagram of the non-volatile storage portion of the service reminder.

The storage 42 is an integrated circuit using MNOS technology. The storage is comprised of a plurality of counters NVD 86, NVM 92 and SPC 90, the first two of which function as a series of P or N-channel MOS binary coded decimal stages. Turning now to NVD 86, the days counter includes a matrix 120 connected to terminal 15 of storage 42 and capable of being initialized to the 304 - days count, as described, a BCD down-counter 122 (herein referred to as "Counter No. 1") having a plurality of decades each including eight MNOS cells which are periodically set, a memory 124 formed by MNOS storage transistors, and a latch and shift register 126 for reading out the present count under control of one of the push buttons. As will be described, power from power supply 128 is provided both NVD 86 and NVM 92 along line 130 connecting with terminal 25 of storage 42.

The operation of NVD 86 may now be apparent. Thus, pulses at a frequency of 1 p/mile at terminal 11 connecting IC-1 40 and storage 42 are provided to set the last count within the binary counter stages of Counter No. 1. Each pulse following a delay interposed by delay network 132 which is sufficient to permit setting of the stages, is applied through network 134 to only those transistors of the memory 124 that are associated at that instant with binary counter stages in the 1 condition. The transistors of the memory function to retain or store information of the count through threshold level shifts if power should be removed from the PSC system, as by removal of the vehicle battery, and to cause the decades of Counter No. 1 to be reset to the count immediately prior to the interruption when power is restored.

The operation of NVM 92 (miles to service) is similar upon an input at terminal 12 connecting IC-1 40 and storage 42. Miles to service information similarly may be obtained, by depression of push button 58, also supported by the front panel 46. Thus, when the operator desires these forms of information the appropriate push button is depressed and the BCD count of Counter No. 1 (or Counter No. 2 of NVM 92) is read out serially at the clock rate. To this end, the latch and shift register 126 is controlled by the output of AND gate 118. The shift register 126 reads the state of Counter No. 1 and under control of AND gate 118 applies the 3-state BCD output to the BCD bus control 112.

The BCD bus control includes a plurality of output buffers 136, 138 and 140 and a network 141 connected to each of the buffers. The network functions to control the impedance level of the buffers normally maintaining them in a high impedance condition thereby to isolate the count of each of NVD 86 (Counter No. 1), NVM 92 (Counter No. 2) and SPC 90 (Counter No. 3) of storage 42 from the BCD bus 142. Therefore, except when controlled by push buttons 56 or 58 or by SRP 108, assuming that power is applied, only information in the form of hours and minutes will be displayed at display zone 60 of the display 38. If, however, a counter of storage 42 is controlled by an input at one of terminals 14, 17 and 18 of the storage, the network 141 controls to a low input impedance condition the appropriate buffer to enable the count of that counter to be displayed. When Counter No. 1, No. 2 or No. 3 is controlled the output of RTR 74 similarly is isolated from the BCD bus 76. All outputs are applied to DD 78 for purposes of energizing the display.

If the days push button 56 is depressed a display continuously will be presented within at least the ones area of display zone 60 and simultaneously the display zones 62 and 64 will be illuminated for soever long as the push button 56 (or for that matter any of the push buttons to be discussed hereafter) remains depressed. It is also comtemplated that a momentary actuation of any of the push buttons will, through conventional circuitry, function to maintain the display for a period, for example, of 5 seconds duration. If the miles push button 58 is depressed a display will be presented within at least the ones area of display zone 60 and simultaneously the display zones 62 and 66 will be illuminated; and, if service is required a display will be presented within the tens area (and ones area if the 10th service period shall have been reached) of display zone 60 and simultaneously the display zone 68 will be illuminated. As indicated, the display within display zone 60 is through control and operation of an array of LED devices. The message panels or display zones 64 and 66 indicating days and miles respectively are integral with the LED display; whereas, electric lamps are disposed behind the remaining display zones to illuminate printed indicia presented therein.

EXPANDED SYSTEM

Reference now may be had to FIGS. 6 and 7 which illustrate an expanded capability of the SR system. Through the incorporation of a second logic integrated circuit 144 (herein referred to as "IC-2") functions as miles to empty, average miles per gallon and others may be displayed on a display 38' by actuation of selected push buttons carried by a panel 44', both modified as required. Other parts of the SR system are as already disclosed and will be identified by like number.

1. Miles to Empty and Average Miles per Gallon

Both of the heading functions require a measurement of miles per gallon and, therefore, will be discussed together.

As indicated, pulses from the distance sensor 94 are divided down in SMD 100 which provides, in addition to the 1 p/mile output to NVM 92, an output of 10 p/mile. The latter output is applied at terminal 21 of IC-2 144 and to a first miles per gallon register 146 (herein referred to as "MPG-1"). These pulses are stored in the register during an interval of consumption of fuel by the vehicle and then MPG-1 146 is reset for storage of a further number of pulses. The number of pulses stored will be equivalent to average miles per gallon, as explained below.

The expanded SR system includes a fuel sensor 148 providing through a variation in resistance an output indicative of the amount of fuel in the gas tank. The fuel sensor is connected to an analog to digital converter 150 (herein referred to as "ADC") which includes a voltage - to - frequency converter. Output pulses from ADC 150, first divided down to provide a proper scale factor, are gated to a comparator 152 (herein referred to as "TGC"). Gating is provided for a fixed time interval once every minute such that the pulses which are gated correspond to the volume of fuel in the tank. TGC 152 is a down-counter which provides an output pulse each and every time that there is a decrease in count corresponding to a 0.1 gallon decrease in the volume of fuel. The output is connected to two differentiators 154 and 156 ultimately to MPG-1 146 and second miles per gallon register 158 (herein referred to as "MPG-2").

The differentiator 156 functions to develop a pulse when the output of TGC 152 goes low, i.e., at the trailing edge, while differentiator 158 functions to develop a pulse when the output of TGC 152 goes high, i.e., at the leading edge. These pulses serve to reset both MPG-1 146 and MPG-2 158, the resetting of the former occurring after a delay interval interposed by delay circuit 160. In operation, AND gate 162 is enabled by the output of differentiator 156 thereby to allow the count stored in the MPG-1 146 to be stored in MPG-2 158 which theretofore was reset by the output of differentiator 154. MPG-1 upon reset, begins counting anew and continues counting until 0.1 gallons of fuel has been consumed. When this occurs, another pulse is obtained from TGC 152. The count transferred to MPG-2 158 representing tenths of miles covered during the consumption of a tenth of a gallon of fuel may be used to obtain the two functions desired.

If average miles per gallon is the function which is desired to be displayed, the operator of the vehicle depresses the appropriate push button (not shown) with the result that the 3-state output of MPG-2 158 is applied to the binary bus 164. In a manner as discussed, the depression of the push button, through a binary bus control 166 (herein referred to as "BBC") reduces the output impedance of that function so that information of that particular function alone is applied to the binary bus 164. All other 3-state outputs to the binary bus are isolated by the maintenance of high output impedance. A binary to BCD converter 168 (herein referred to as "BC") is operated simultaneously to cause the converted 3-state output of BCD to be applied to the BCD bus 142 and thence to DD 78 for display through IC-1 40.

The function of miles to empty is obtained by multiplying the average miles per gallon, the reading of MPG-2 158, by the volume of fuel remaining in the tank. To this end, as indicated, ADC 150 provides an output whose frequency is proportional to the level of fuel in the tank. This output is further connected to a multiplier circuit memory 170 (herein referred to as "MEM"). MEM 170 is a rate multiplier whose output pulse repetition rate is the product of the input from ACD 150 and MPG-2 158. The output of MEM 170 modified by the output of MPG-2 158 is gated at clock frequency to a register 172 (herein referred to as "MTE"). The gating interval and the range of pulse repetition rates of the system are chosen such that pulses stored in MTE represent the miles to empty reading. This reading similarly is converted to BCD form and gated to the display, on demand.

2. Trip Time

The function of trip time may be provided by a trip time register 174 (herein referred to as "TTR") having an input connected to terminal 20 of IC-2 144. This input constitutes the 1ppm output of OFD 72. TTR 174 may be reset by external means at the beginning of the trip by an input at terminal 23 of IC-2 144. The 3-state BCD output of TTR 174 is gated to the display 38', on demand, by depression of a push button (not shown).

3. Trip Miles

A further function of trip miles may be provided by a trip miles register 176 (herein referred to as "TMR") whose input also is connected to the 10 p/mile output of SMD 80 at terminal 21 of IC-2 144. The register which is reset as TTR 174 provides a binary output indicative of miles travelled, which output is converted to BCD form and applied to the display 38' on demand.

4. Miles to Destination

Yet, an additional function of miles to destination may be provided by a miles to destination register 178 (herein referred to as "MTD") formed by a down-count counter. MTD is provided with an initializing input which comprises the output of AND gate 180. One input terminal of AND gate 180 is connected to the BCD bus control 142 at terminal 22 of IC-2 144 and the other to an enabling set pulse at terminal 24 of the same circuit. Thus, MTD can be preset to any predetermined mileage and functions to count-down at the rate of 10 p/mile input terminal 21 of IC-2 144. The output is converted to BCD form aand applied to display 38', on demand.

Figure 5:
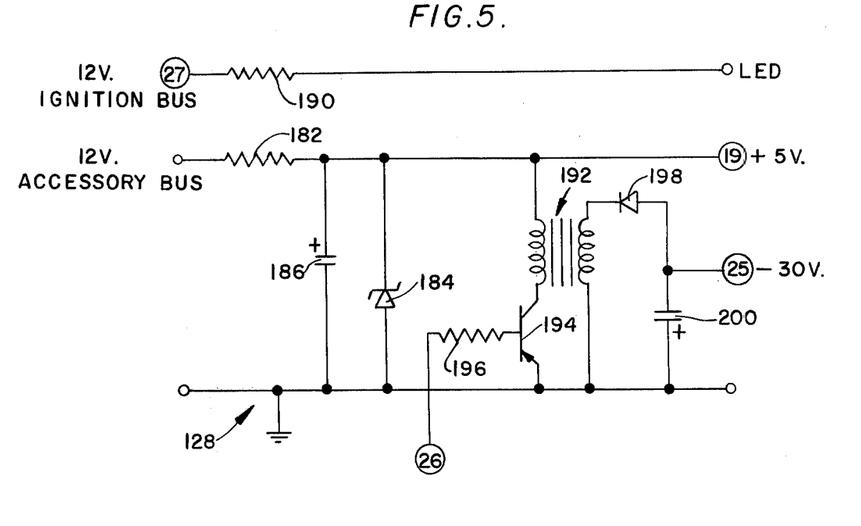
FIG. 5 is a schematic illustration of the power supply for the service reminder.

The power conditioner circuit 118 may be seen to best advantage in FIG. 5. The power circuit provides a 5v. output (at no more than about 7ma) at terminal 19 of both integrated circuits. This output is obtained from the 12v. accessory bus by the divider network including resistor 182 and Zener diode 184. This combination will prevent any continuous overstress voltage from being impressed on the system. The higher current required when the display is energized is obtained in the same manner except that the resistance of resistor 190 is of lower value than that of resistor 182 and the voltage is developed across the 12v. ignition bus. This latter voltage is for the purpose of energizing the LED display which, as discussed, may only be energized when the ignition is "on" to conserve power in the system. The input is at terminal 27 of the power conditioner circuit 118 connected to the ignition terminal 7 of IC-1 40. Capacitors, such as the capacitor 186 provides filtering, as needed. Additional capacitors may be used for R.F. bypass.

The power circuit additionally provides a negative 30v. (at about 6.5ma) connected to the network 134 of the memory 122 of NVD 86 (and similarly NVM 92). The voltage is for purposes of energization of the memory. The voltage is presented at terminal 25 of storage 42.

The input to the power converter is taken at terminal 26 of IC-1 40 and comprises an output of OFD 72. The frequency of the output of OFD will be in the ultrasonic range thereby to enable the use of a small size step-up transformer 192 including a ferrite core. As illustrated, the transformer is driven by transistor 194 of the PNP-type whose emitter is grounded. The resistor 196 provides bias for the base of transistor 194 while diode 198 provides half wave rectification at the secondary. Capacitor 200 serves as a storage capacitor.

The parameters of the coil are chosen for purposes of developing a minimum of −30 volts DC under worst case conditions. The input to the converter from the 5 volt supply will provide the regulation required for the −30 volts supply.

As described, the SR system provides with high reliability capability to provide the various described forms of information which, in the automotive environment, are of interest to the operator of a vehicle. The SR system also has been demonstrated to provide expanded capability and by means of a non-volatile storage will retain information over an extended period in a memory even through power to the system is disconnected. Memory retention capability over a period of disconnection of power of about two years is considered possible.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. A system for automotive vehicles adapted both for providing automatically at least a display representing a time function in minutes and hours and upon manual activation a different display to advise the operator of said automotive vehicle of the state of a selected one of a plurality of other functions which periodically are changing, said system comprising:
    a. circuit means including
        1. a source of a first input frequency,
        2. first divider means connected to said source providing an output which is of a frequency comprising a division of said first input frequency,
        3. second divider means having an output of a frequency comprising a further division of said first input frequency,
        4. means connecting said first and second divider means whereby said output of said first divider means comprises the input of said second divider means, and
        5. a time register also connected to said output of said first divider means, said time register being continuously updated during operation of said system;
    b. storage means comprising at least a first storage network, said first storage network connected to said second divider means thereby both to receive said output of said second divider means and store information so that said first storage network continually represents the then present condition of one of said plurality of other functions;
    c. a display adapted normally to display said time function and upon command to discontinue said normal display and to display said selected one of said plurality of other functions;
    d. means connecting each of said storage means and time register to said display, said connecting means including
        1. control means included between said display and storage means for gating said selected one of said plurality of other functions to said display and isolating all other functions from said display;
    e. means for activating said control means; and
    f. power means for energizing each of said circuit means, storage means and display.

2. The system of claim 1 wherein said first storage network comprises a first down counter which is adapted to be initialized to a value and to count down by a single count to zero upon receipt of each output of said second divider means.

3. The system of claim 2 wherein said storage means comprises a second storage network, said second storage network including a counter, and means connecting an input of said counter to an output of said first down counter, said first down counter adapted to provide said output each time said first down counter counts to zero from said initialized value.

4. The system of claim 3 wherein said output of second divider means has a frequency of one pulse per day and said first down counter provides said output after passage of a number of days.

5. The system of claim 3 wherein said means connecting said first and second divider means comprises
    a. first gating means connecting an input terminal of said second divider means to said output of said first divider means and wherein said system further comprises means for enabling said first gating means thereby to pass said output of said first divider means to said second divider means.

6. The system of claim 5 wherein said enabling means is connected to said counter so that each time said first down counter provides said output said enabling means disables said gating means whereby said input to said input terminal of said second divider is discontinued.

7. The system of claim 1 wherein said first storage network comprises
    a. a first down counter,
    b. means for reading out said information from said first down counter indicative of said then present condition of said one of said changing functions, and
    c. means continuously providing a memory of said condition of said changing function thereby to retain said information in said first storage network during a period when said control means gates said information to said display.

8. The system of claim 7 wherein said memory means is capable of retaining over a period of time said information of said changing function in said storage network even though unenergized.

9. The system of claim 7 wherein said control means is connected to said means for reading out said memory means.

10. The system of claim 9 wherein said control means includes a buffer for each storage network, said buffer connected to said means for reading out said memory means, said first divider means having a second output whose frequency also comprises a division of said first input frequency, third gate means connecting said second output and said shift register, and means enabling said third gate means.

11. The system of claim 10 wherein said means enabling said third gate means includes a push button for closing a signal path both to said third gate and control means whereby said information may be read out of said means for reading out said memory means.

12. The system of claim 11, wherein said means for reading out said memory means comprises a shift register.

13. The system of claim 1 wherein said circuit means comprises
   a. a source of a second input,
   b. third divider means having an output comprising a division of said second input, and
   c. means connecting said source of said second input to an input terminal of said third divider means; and wherein said storage means comprises a third storage network, said third storage network being connected to said third divider means thereby both to receive said output of said third divider means and store information so that said third storage network continually represents the changing condition of another one of said plurality of changing functions.

14. The system of claim 13 wherein said third storage network comprises a second down counter which is adapted to be initialized to a value and to count down by a simple count to zero upon receipt of each output of said third divider means.

15. The system of claim 14 wherein said storage means comprises a second storage network, said second storage network comprising a counter, and means connecting an input of said counter to an output of both said first and second down counters, said first and second down counters providing said output each time one or the other or both simultaneously of said first and second down counters count to zero from said initialized value.

16. The system of claim 15 wherein said output of said third divider means has a frequency of one pulse per mile and said second down counter provides said output after travel of a number of miles.

17. The system of claim 15 wherein said means connecting said counter to said first and second down counters comprises an OR gate, said OR gate further being connected to a zero set terminal of each of said first and second down counters so that each of said first and second down counters will be set to zero irrespective of its then present condition.

18. The system of claim 15 wherein said circuit means includes
   a. second gating means connecting an input terminal of said third divider means to said source of said second input frequency; and wherein said system further comprises means for enabling said second gating means thereby to pass said second input frequency to said third divider means.

19. The system of claim 18 wherein said enabling means is connected to said counter so that each time one or the other or both simultaneously of said first and second down counters provides said output said enabling means disables said second gating means whereby said input to said input terminal of said second divider is discontinued.

20. The system of claim 19 including means for initializing each said first and second down counters to said initialized values and for reenabling said first and second gating means whereby both said first and second down counters may again receive and store said outputs of said second and third divider means, respectively.

21. The system of claim 13 wherein said control means includes a plurality of buffers, each buffer having an input connected to an output of a respective one of said storage networks and normally isolating said storage networks from said display, and means connected to said buffers whereby upon one of said automatic or manual activation information from a selected storage network is connected to said display.

22. The system of claim 18 wherein an output of said second storage network provides automatic activation whereby information stored therein is gated to said display.

23. The system of claim 13 wherein said third divider means forms a miles divider and provides a further output, each pulse of which represents a predetermined distance travelled, said system further comprising
   a. second circuit means including
      1. a fuel sensor,
      2. a comparator providing an output each time a volume of fuel used compares with a predetermined volume,
      3. means for connecting said fuel sensor and comparator,
      4. register means adapted to count said pulses of said further output of said third divider means and to store said count during a period for readout on demand, and
      5. means connecting said register means and comparator thereby to reset said register means each time there occurs an output from said comparator so that said register means starts the next count.

* * * * *